United States Patent
Lee et al.

(10) Patent No.: US 6,937,448 B2
(45) Date of Patent: Aug. 30, 2005

(54) SPIN VALVE HAVING COPPER OXIDE SPACER LAYER WITH SPECIFIED COUPLING FIELD STRENGTH BETWEEN MULTI-LAYER FREE AND PINNED LAYER STRUCTURES

(75) Inventors: Wen-Yaung Lee, San Jose, CA (US); Tsann Lin, Saratoga, CA (US); Danielle Mauri, San Jose, CA (US); Alexander Michael Zeltser, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 164 days.

(21) Appl. No.: 10/294,109

(22) Filed: Nov. 13, 2002

(65) Prior Publication Data

US 2004/0090717 A1 May 13, 2004

(51) Int. Cl.[7] .................................................. G11B 5/39
(52) U.S. Cl. .................................................. 360/324.1
(58) Field of Search .................... 360/324.11, 324.1, 360/324.2

(56) References Cited

U.S. PATENT DOCUMENTS

| | | | | |
|---|---|---|---|---|
| 6,226,159 B1 * | 5/2001 | Pinarbasi | ............... | 360/324.11 |
| 6,338,899 B1 | 1/2002 | Fukuzawa et al. | ........... | 438/332 |
| 6,600,638 B2 * | 7/2003 | Gill | ....................... | 360/324.11 |
| 6,613,240 B2 * | 9/2003 | Skinner et al. | ................ | 216/38 |
| 6,709,767 B2 * | 3/2004 | Lin et al. | .................. | 360/324.1 |
| 6,710,985 B2 * | 3/2004 | Noma | ..................... | 360/324.11 |
| 2001/0014412 A1 | 8/2001 | Jongill et al. | ................ | 428/692 |
| 2001/0026470 A1 | 10/2001 | Gillies et al. | ................ | 365/158 |
| 2001/0036046 A1 | 11/2001 | Mizuguchi | .............. | 360/324.11 |
| 2002/0041473 A1 | 4/2002 | Hoshiya et al. | ......... | 360/324.11 |
| 2003/0053268 A1 * | 3/2003 | Lin et al. | .................. | 360/324.1 |

FOREIGN PATENT DOCUMENTS

JP    2000348311 A    12/2000

OTHER PUBLICATIONS

"Effect of plasma treatment on the GMR properties of PtMn–based synthetic spin–valves", Tsunekawa et al., Abstracts on the 46th Annual Conference on Magnetism & Magnetic Materials, BD–04, p. 65, Nov. 2001.*
IBM Research Disclosure, Dec. 1999, p. 1713, entitled: "GMR Sensor with Free Layer Magnetic Easy Axis Perpendicular to Air Bearing Surface", No 428156.
IBM Research Disclosure, Apr. 2000, p. 752, entitled;"New Spacer for GMR Sensor", No 432132.
IBM Research Disclosure, Apr. 2000, p. 753, entitled: "Dual GMR Sensor with Canted Pinned Magnetization", and "Dual GMR Sensor Design with Improved Stability/Biasing", Nos 432135 & 432136.

* cited by examiner

*Primary Examiner*—Craig A. Renner
(74) *Attorney, Agent, or Firm*—Robert O. Guillot; Intellectual Property Law Offices

(57) ABSTRACT

A magnetic head including a spin valve sensor having a sensor layer stack that includes a pinned magnetic layer, a spacer layer formed on the pinned magnetic layer, and a free magnetic layer formed on the spacer layer. In a preferred embodiment the spacer layer is comprised of $CuO_x$. Plasma smoothing of the upper surface of the pinned magnetic layer is conducted prior to depositing the spacer layer, and a preferred plasma gas is a mixture of argon and oxygen.

8 Claims, 2 Drawing Sheets

SPIN VALVE HAVING COPPER OXIDE SPACER LAYER WITH SPECIFIED COUPLING FIELD STRENGTH BETWEEN MULTI-LAYER FREE AND PINNED LAYER STRUCTURES

BACKGROUND OF THE INVENTION

1. Field of the Invention

The present invention relates generally to spin valve sensors for magnetic heads, and more particularly to plasma smoothing of the pinned magnetic layer surface of a spin valve sensor structure.

2. Description of the Prior Art

Magnetic heads for hard disk drives typically have a read head portion including a magnetoresistive (MR) spin valve sensor structure for reading data from the disk of the hard disk drive. As is well known to those skilled in the art, such MR sensor structures include a plurality of thin film layers disposed between two magnetic shields that define the read gap. The thin film layers have particular magnetic properties, and are sensitive to the magnetic field of the data bits on the hard disk.

The thin film layers of a typical MR spin valve sensor will include at least one antiferromagnetic layer, at least one pinned magnetic layer, a spacer layer and at least one free magnetic layer. When the magnetic field direction of the free magnetic layer is parallel to the magnetic field direction of the pinned magnetic layer, the electrical resistance R of the MR sensor is lowest. When reading data, a magnetic data bit of a hard disk will cause the magnetic field direction of the free magnetic layer to change, whereupon the electrical resistance of the sensor increases. This change in resistance ($\Delta R$) affects the electrical current passing through the sensor, which is thus detected as a data signal.

It is desirable to develop MR sensors having a decreased thickness, while maintaining or even increasing the $\Delta R$ value. Where the metallic MR sensor layers, and particularly the spacer layer, are made thinner, the electrical resistance of the thinner layers increases and there is less shunting of electrical current through these layers and away from the free magnetic layer. This leads to an increase in the sensor resistance R and in $\Delta R$, and this results in improved magnetic head performance. Another parameter that is significant in spin valve sensor performance is the magnetic coupling field strength between the pinned and free magnetic layers, and it is important to maintain this coupling field strength to maintain the spin valve performance.

Many different materials and fabrication steps have been utilized in the prior art in attempts to increase $\Delta R$ of the MR sensor. The present invention relates to a MR spin valve sensor that is fabricated utilizing a surface smoothed pinned magnetic layer. This allows the use of a thinner spacer layer, thus leading to an increased electrical resistance R of the sensor and a higher $\Delta R$, which correlates to a stronger read head signal.

It has been described in an abstract of prior art paper entitled "Effect of Plasma Treatment on the GMR Properties of PtMn Based Synthetic Spin Valve," by K. Tsunekawa, D. Nakagima and N. Watanabe, presented as paper BD-04 at the 46th Annual Conference on Magnetism and Magnetic Materials, in Seattle, Wash., USA on Nov. 12–16, 2001, that with respect to a GMR spin valve sensor, that the surface of a pinned magnetic layer can be smoothed utilizing a low voltage argon plasma. A copper spacer layer and a free magnetic layer are then deposited. The resulting GMR sensor was shown to be improved by having an increased signal strength.

The present invention is an improvement upon this prior art in that it's utilizes an improved plasma comprised of argon plus oxygen, and that it utilizes an MR head having a $CuO_x$ spacer layer between the pinned and free magnetic layers.

SUMMARY OF THE INVENTION

The magnetic head of the present invention includes a spin valve sensor read head having a sensor layer stack that includes a pinned magnetic layer, a spacer layer formed on the pinned magnetic layer, and a free magnetic layer formed on the spacer layer. In a preferred embodiment the spacer layer is comprised of $CuO_x$. Improved spin valve sensor properties are obtained by plasma smoothing the upper surface of the pinned magnetic layer prior to depositing the spacer layer, and a preferred plasma gas is a mixture of argon and oxygen. The plasma smoothing of the pinned magnetic layer has the effect of increasing the negativity of the magnetic coupling field strength between the pinned and free magnetic layers, and the spacer layer can then be made thinner to adjust the coupling field strength to its desired value. The reduced thickness of the spacer layer results in increased sensor resistance and an increase in the sensor signal amplitude. In the preferred embodiment, the $CuO_x$ spacer thickness is reduced from approximately 20 Å to approximately 16 Å.

It is an advantage of the magnetic head of the present invention that it includes a magnetoresistive sensor having a decreased sensor spacer layer thickness.

It is another advantage of the magnetic head of the present invention that it includes a magnetoresistive sensor having a decreased sensor spacer layer thickness, an increased sensor signal amplitude.

It is a further advantage of the magnetic head of the present invention that it includes a $CuO_x$ spacer layer disposed upon a pinned magnetic layer having a smoothed surface.

It is yet another advantage of the magnetic head of the present invention that it includes a laminated pinned magnetic layer having a plasma smoothed upper surface, with a reduced thickness $CuO_x$ spacer layer disposed thereon, that results in a sensor an increased signal amplitude.

It is an advantage of the hard disk drive of the present invention that it includes a magnetic head of the present invention that includes a magnetoresistive sensor having a decreased sensor spacer layer thickness.

It is another advantage of the hard disk drive of the present invention that it includes a magnetic head of the present invention that includes a magnetoresistive sensor having a decreased sensor spacer layer thickness, an increased sensor signal amplitude.

It is a further advantage of the hard disk drive of the present invention that it includes a magnetic head of the present invention that includes a $CuO_x$ spacer layer disposed upon a pinned magnetic layer having a smoothed surface.

It is yet another advantage of the hard disk drive of the present invention that it includes a magnetic head of the present invention that includes a laminated pinned magnetic layer having a plasma smoothed upper surface, with a reduced thickness $CuO_x$ spacer layer disposed thereon, that results in a sensor an increased signal amplitude.

It is an advantage of the method for fabricating a magnetic head of the present invention that it includes a pinned magnetic layer having a plasma smoothed upper surface and a $CuO_x$ spacer layer having a reduced thickness, such that increased signal amplitude of the sensor results.

The foregoing and other objects, features, and advantages of the present invention will be apparent from the following detailed description of the preferred embodiments which make reference to the several figures of the drawing.

IN THE DRAWINGS

The following drawings are not made to scale of an actual device, and are provided for illustration of the invention described herein.

DETAILED DESCRIPTION OF THE PREFERRED EMBODIMENTS

Figure 1:
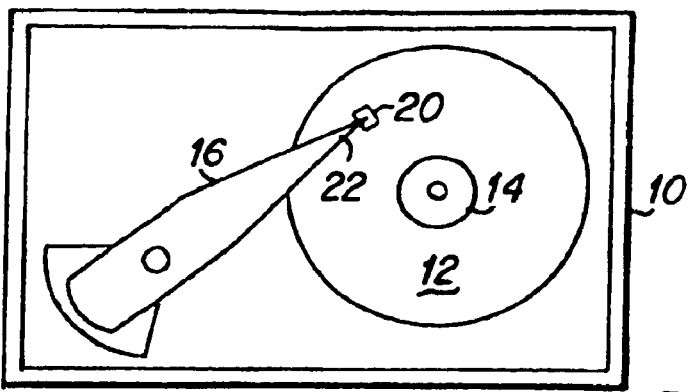
FIG. 1 is a top plan view generally depicting a hard disk drive that includes a magnetic head of the present invention.

FIG. 1 is a top plan view that depicts significant components of a hard disk drive which includes the magnetic head of the present invention. The hard disk drive 10 includes a magnetic media hard disk 12 that is rotatably mounted upon a motorized spindle 14. An actuator arm 16 is pivotally mounted within the hard disk drive 10 with a magnetic head 20 of the present invention disposed upon a distal end 22 of the actuator arm 16. A typical hard disk drive 10 may include a plurality of disks 12 that are rotatably mounted upon the spindle 14 and a plurality of actuator arms 16 having one or more magnetic heads 20 mounted upon the distal end 22 of the actuator arms. As is well known to those skilled in the art, when the hard disk drive 10 is operated, the hard disk 12 rotates upon the spindle 14 and the magnetic head 20 acts as an air bearing slider that is adapted for flying above the surface of the rotating disk. The slider includes a substrate base upon which the various layers and structures that form the magnetic head are fabricated. Such heads are fabricated in large quantities upon a wafer substrate and subsequently sliced into discrete magnetic heads 20.

Figure 2:
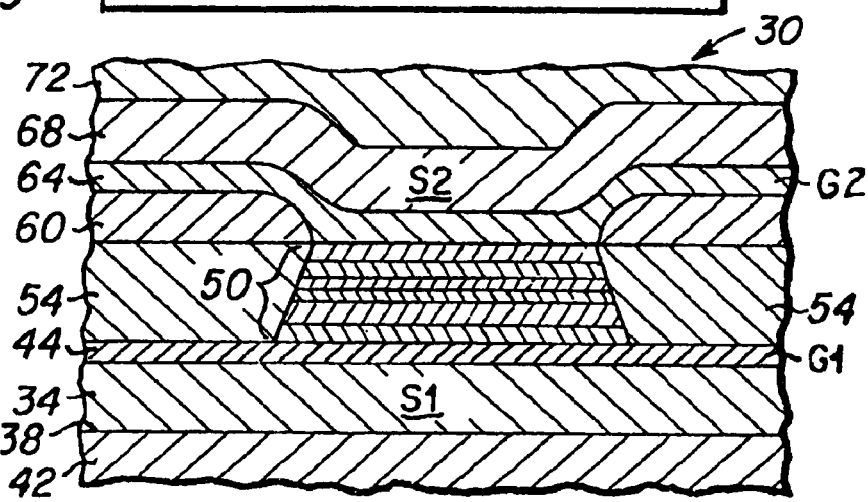
FIG. 2 is a side cross-sectional view depicting a typical prior art spin valve read head portion of a magnetic head.

A typical prior art magnetic head is fabricated to include a read head portion for reading data from the hard disk and a write head portion for writing to a hard disk, and FIG. 2 is a generalized depiction of a prior art read head spin valve portion of a magnetic head which will serve as a starting point for the description of the novel read head features of the present invention. As depicted in FIG. 2, the spin valve 30 includes a first magnetic shield layer (S1) 34 that is fabricated upon the surface 38 of a substrate base 42. A first insulation layer (G1) 44 is fabricated upon the S1 shield 34 and a plurality of spin valve sensor layers 50 are then fabricated upon the G1 layer 44. A detailed description of the sensor layers 50 is provided hereinbelow, and the novel sensor layers of the present invention are then discussed. Using photolithographic and etching techniques, portions of the sensor layers are removed such that the central portions 50 depicted in FIG. 2 remain. Thereafter, hard bias elements 54 are fabricated next to the sensor layers 50, electrical leads 60 are fabricated upon the hard bias elements 54, a second electrical insulation layer (G2) 64 is deposited across the device followed by the fabrication of a second magnetic shield (S2) 68, and a write head portion (generally indicated as 72) is subsequently fabricated to complete the magnetic head fabrication process.

Figure 3:
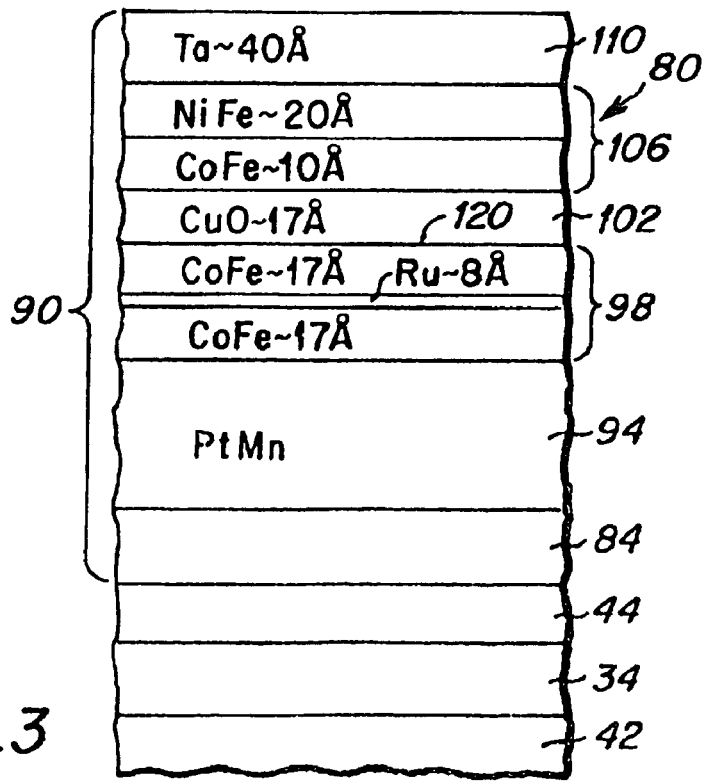
FIG. 3 is a side cross-sectional view depicting typical thin film layers that may be utilized in fabricating a first embodiment of the spin valve sensor structure of the present invention.

The present invention is directed towards improvements in the specific layers that comprise the sensor layer stack 50 of the spin valve, and a more detailed depiction of a magnetoresistive (MR) spin valve sensor, such as may be utilized as an improved sensor 80 of the present invention in the magnetic head 20 of FIG. 1 is depicted in FIG. 3. As depicted in FIG. 3, a G1 insulation layer 44 typically composed of $Al_2O_3$, is fabricated upon the S1 shield layer 34, that may typically be composed of NiFe. This is followed by the fabrication of the spin valve layer structure 90, commencing with a seed layer 84 that may be composed of an $AlO_x$ sublayer, an NiFeCr sublayer, and a NiFe sublayer. Following the seed layer deposition, the sequence of sensor layers in the spin valve layer structure 90 includes a PtMn antiferromagnetic layer 94, a CoFe/Ru/CoFe laminated pinned magnetic layer 98, a $CuO_x$ spacer layer 102, a CoFe/NiFe free magnetic layer 106, and a Ta cap layer 110, and the typical thickness of the various layers is set forth in FIG. 3.

Magnetoresistive spin valve sensors, such as are described herein, operate by detecting magnetic data bits written upon a hard disk through a change in electrical resistance within the spin valve sensor when the sensor is exposed to the magnetic field of the data bit. Specifically, the orientation of the magnetic field of the free magnetic layer field is altered by the magnetic field of a data bit, and the change in the orientation of the free layer magnetic field creates a change in the electrical resistance R of the sensor. The electrical resistance of the sensor is lowest (Rmin) when the free layer magnetic field is oriented parallel to the pinned layer magnetic field, and the resistance of the sensor increases when the free layer magnetic field is oriented other than parallel to the pinned layer magnetic field direction. This change in resistance R–Rmin is generally designated as ΔR. Significantly, the resistance R of the sensor is determined in large part by the resistance of the spacer layer, and generally a thinner spacer layer will typically have a higher resistance R, which will generally result in a higher value for ΔR, provided the magnetoresistance coefficient ΔR/R remains constant. Another important parameter in spin valve performance is the strength of the magnetic coupling field between the pinned magnetic layer and the free magnetic layer. This magnetic coupling field is held within a desired range to promote good SV performance, as is described more fully herebelow.

Therefore, it is a performance goal for the spin valve sensor of the present invention to have an increased electrical resistance R and an increased ΔR while maintaining the magnetic coupling field within a desired range, as well as to not negatively affect other sensor properties such as ΔR/R and coercivity. As will appear from the following description, an improvement in the smoothness of the upper surface of the pinned magnetic layer results in improved spin valve sensor properties.

Returning to FIG. 3, the focus of the present invention is on the upper surface 120 of the pinned magnetic layer 98. Specifically, where the surface 120 is smooth, the magnetic coupling between the pinned and free magnetic layers occurs becomes more negative. Then, to adjust the magnetic coupling value back to its original, more desired value, the thickness of the spacer layer 102 can be reduced. Finally, due to the reduced thickness of the spacer layer, the electrical resistance of the spacer layer (and therefore the sensor) is increased, which also creates an increase in ΔR (since ΔR/R remains constant), thereby increasing the signal amplitude of the sensor signal. It is therefore to be understood that the smoothing of the surface of the pinned magnetic layer 98 results in a thinner spacer layer 102 and improved sensor performance characteristics.

The effects of smoothing the surface of the pinned magnetic layer of a GMR spin valve sensor having a copper spacer layer have been reported by others, see "Effect of Plasma Treatment on the GMR Properties of PtMn Based Synthetic Spin Valve," by K. Tsunekawa, D. Nakagima and N. Watanabe, presented as paper BD-04 at the 46th Annual Conference on Magnetism and Magnetic Materials, in Seattle, Wash., USA on Nov. 12–16, 2000. A low voltage argon plasma was used in this prior art pinned layer smoothing process, with a Cu spacer then being deposited upon the argon plasma smoothed surface.

In a preferred embodiment of the present invention, as depicted in FIG. 3, a $CuO_x$ spacer is used in the sensor structure 90, and a plasma process gas of argon plus oxygen is used to perform the surface smoothing of the pinned magnetic layer prior to the deposition of the spacer layer. As will be understood by those skilled in the art, the magnetic head sensor fabrication process is conducted in a multi-chamber fabrication device in which one or more wafers are disposed upon a wafer chuck, and the wafer chuck is movable into a plurality of chambers in which various layers and processes are performed. With reference to the present invention, the wafer chuck is moved into successive chambers where the various sensor film layers are sequentially deposited, including the S1 shield, the G1 insulation layer, the seed layer, the antiferromagnetic layer, and the pinned magnetic layer. Following the deposition of the pinned magnetic layer, the plasma process gas is introduced into the processing chamber and a low bias voltage is applied to the chuck. A plasma is struck for a short period of time in which the surface of the pinned magnetic layer is exposed to the plasma, and the smoothing of the surface is achieved.

With regard to the surface smoothing process of the present invention, the wafer chuck having a wafer with the pinned magnetic layer deposited thereon is disposed in a process chamber at a pressure of from approximately $1 \times 10^{-3}$ Torr to approximately $3 \times 10^{-3}$ Torr. The argon plus oxygen plasma gas mixture is introduced at a flow rate of approximately 50 sccm and it is comprised of approximately 49.5 sccm pure argon plus 0.5 sccm of an 80% argon plus 20% oxygen gas mixture. This correlates to an oxygen partial pressure of approximately $2 \times 10^{-6}$ Torr. It has been discovered that an oxygen partial pressure of from $0.5 \times 10^{-6}$ to approximately $6 \times 10^{-6}$ Torr will provide superior surface smoothing results. A wafer chuck bias voltage of from approximately 25 to approximately 70 volts, and preferably from 30 to 60 volts, is used to support the plasma, where the plasma striking voltage is approximately 25 volts. A surface smoothing plasma exposure time of from approximately 15 to approximately 60 seconds is sufficient to achieve the surface smoothing effects of the present invention. As will be appreciated by those skilled in the art, the surface smoothing time exposure is a function of parameters such as the bias voltage and plasma composition.

Following the plasma surface smoothing step, the wafer chuck is moved to a spacer deposition chamber, and a $CuO_x$ spacer layer 102 is next deposited upon the smoothed surface 120 of the pinned magnetic layer 98. The $CuO_x$ is deposited at approximately 1 Å per second, thus a deposition time of approximately 16 to 20 seconds is utilized in the present invention to obtain a $CuO_x$ thickness of approximately 16 to 20 Å, with a preferred $CuO_x$ thickness being approximately 17 Å. Thereafter, the free magnetic layer and cap layer are sequentially deposited.

The $CuO_x$ spacer layer has an increased electrical resistance as compared to the prior art Cu spacer. Additionally, the properties of the $CuO_x$ spacer result in a negative magnetic coupling field between the pinned and free magnetic layers. The strength of this coupling field is a significant sensor parameter that affects the rotation of the magnetic field of the free magnetic layer and thus the performance of the sensor. The strength of the coupling field is affected by the thickness of the spacer layer between the pinned and free magnetic layer, and as is discussed more fully below, it is an important feature of the present invention to maintain the coupling field strength within a desired range, and thereby reduce the thickness of the spacer layer.

Figure 4:
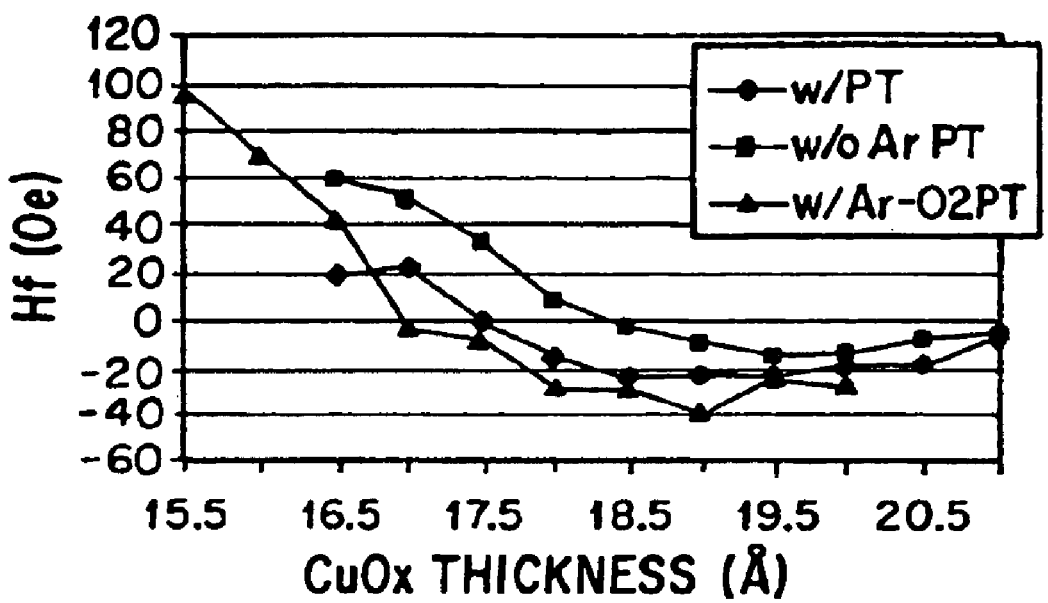
FIG. 4 is a graph depicting the performance characteristics of the argon plus oxygen plasma smoothed pinned magnetic layer of the magnetic head of the present invention.

It is therefore to be understood that a key contributor to the coupling field strength is the nano-scale roughness of the pinned layer spacer layer interface, and as is shown in FIG. 4, a reduction in this roughness leads to a reduction in coupling field for a given spacer thickness or conversely allows one to reduce the spacer thickness while maintaining a given coupling field. A reduction in the spacer thickness is beneficial in two ways, the ΔR/R of the sensor increases as the spacer becomes thinner, while at the same time the sensor resistance R becomes larger. The product of ΔR/R and R is ΔR, which is a good figure of merit for predicting signal amplitude in a read head. As is shown in FIG. 5 and discussed below, this figure of merit and thus the magnetic head signal is improved by reducing the pinned layer surface roughness.

FIG. 4 is a graph showing the coupling field strength Hf through the GMR spacer as a function of the spacer thickness. The spacer is oxygen doped Cu in this case, where it is known that oxygen inclusion in Cu is beneficial in reducing the coupling field. The data in square symbols shows the coupling field for a normally deposited sensor layer stack with a CuO spacer layer composition. The data in diamond symbols shows the coupling field reduction due to plasma smoothing using argon gas only. Finally the data in triangle symbols shows a further coupling field reduction when using an argon plus oxygen plasma. It can therefore be seen that without plasma smoothing (square symbols) that the coupling field strength range of −5 to −15 Oe is achieved with a $CuO_x$ spacer thickness of approximately 19 Å, and that with an argon plasma smoothing (diamond symbols) that the coupling field strength of −5 to −15 Oe is achieved with a $CuO_x$ spacer thickness of approximately 18 Å. The preferred plasma smoothing of the present invention using an argon plus oxygen plasma (triangle symbols) and a $CuO_x$ spacer layer with a coupling field strength of −5 to −15 Oe results in a spacer layer thickness of approximately 17 Å. It is apparent from these curves that these plasma treatments considerably enlarge the process window for negative coupling. Thus, plasma smoothing can be employed to reduce the spacer thickness while keeping a fixed coupling field value.

Figure 5:
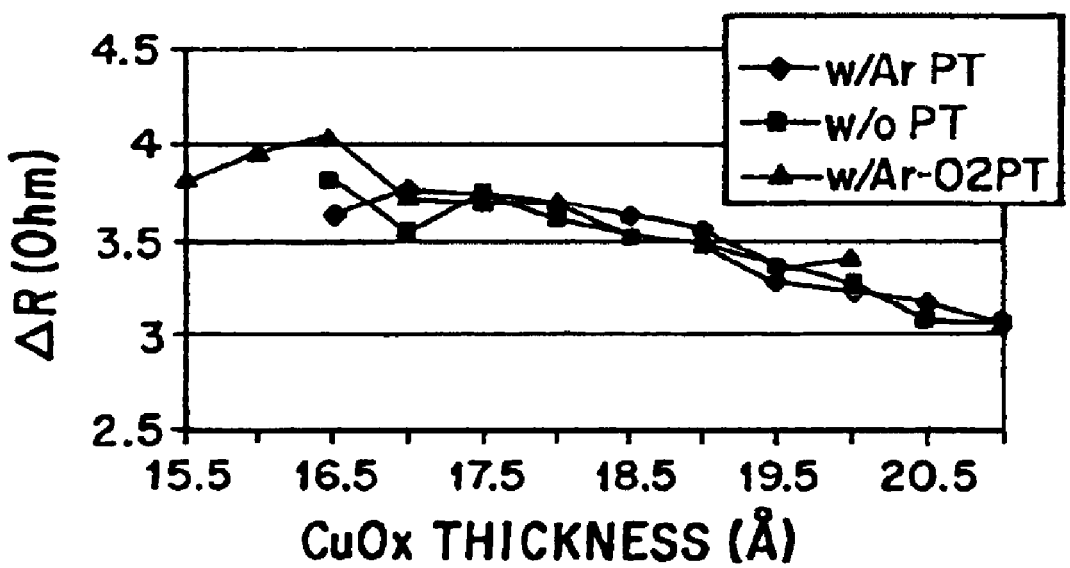
FIG. 5 is a graph providing performance data of the magnetic head of the present invention.

FIG. 5 is a graph showing how the figure of merit (ΔR, which is equal to ΔR/R times sheet resistance (R)) varies with the $CuO_x$ spacer thickness. The data in square symbols shows the ΔR values for a normally deposited sensor layer stack with a CuO spacer layer composition. The data in diamond symbols shows the ΔR values due to plasma smoothing using argon gas only. Finally the data in triangle symbols shows the ΔR values when using an argon plus oxygen plasma. It can therefore be seen that generally ΔR increases as the $CuO_x$ spacer layer thickness is reduced. Thus, the present invention allows the deposition of a thinner spacer layer and thus an increase in ΔR which corresponds to improved GMR sensor performance.

The spin valve sensor of the present invention is an improvement over the prior art described above, in that the smoothing of the surface of the pinned magnetic layer is conducted utilizing a plasma gas mixture comprising argon plus oxygen, and also in that the spacer layer is comprised of $CuO_x$ instead of Cu. Each of these changes results in an improvement over the prior art, and when combined together in a preferred embodiment of the present invention, they create a further improved device.

While the present invention has been shown and described with regard to certain preferred embodiments, it is to be understood that those skilled in the art will no doubt develop certain alterations and modifications in form and detail therein. It is therefore intended that the following claims cover all such alterations and modifications that nevertheless include the true spirit and scope of the present invention.

What is claimed is:

1. A magnetic head including a spin valve sensor comprising:
    a magnetic shield layer (S1) being fabricated above a substrate base;
    a first electrical insulation layer (G1) being fabricated above said S1 layer;
    a spin valve sensor structure being disposed above said G1 layer;
    wherein said spin valve sensor structure includes a seed layer being fabricated above said G1 layer, an antiferromagnetic layer being disposed above said seed layer, a pinned magnetic layer being comprised of a laminated structure including layers of CoFe, Ru, nd CoFe and being disposed above said antiferromagnetic layer, a spacer layer being comprised of $CuO_x$ and being disposed upon said pinned magnetic layer, and a free magnetic layer being comprised of a laminated structure including layers of CoFe and NiFe and being dispose upon said spacer layer; and
    wherein a magnetic coupling field exists across said $CuO_x$ spacer layer having a coupling field strength of from −5 Oe to −15 Oe, and said $CuO_x$ spacer layer is formed with a thickness of from 16 Å to 20 Å.

2. A magnetic head as described in claim 1, wherein said coupling field strength is approximately −10 Oe, and said $CuO_x$ spacer thickness is approximately 17 Å.

3. A magnetic head as described in claim 1 wherein said pinned magnetic layer laminated structure includes layers of CoFe, Ru, and CoFe having thicknesses of 17 Å, 8 Å and 17 Å respectively.

4. A magnetic head as described in claim 1 wherein said free magnetic layer laminated structure includes layers of CoFe and NiFe having thicknesses of 10 Å and 20 Å respectively.

5. A hard disk drive including a magnetic head including a spin valve sensor comprising:
    a magnetic shield layer (S1) being fabricated above a substrate base;
    a first electrical insulation layer (G1) being fabricated above said S1 layer;
    a spin valve sensor structure being disposed above said G1 layer;
    wherein said spin valve sensor structure includes a seed layer being fabricated above said G1 layer, an antiferromagnetic layer being disposed above said seed layer, a pinned magnetic layer being comprised of a laminated structure including layers of CoFe, Ru, and CoFe and being disposed above said antiferromagnetic layer, a spacer layer being comprised of $CuO_x$ and being disposed upon said pinned magnetic layer, and a free magnetic layer being comprised of a laminated structure including layers of CoFe and NiFe and being disposed upon said spacer layer; and
    wherein a magnetic coupling field exists across said spacer layer having a coupling field strength of from −5 Oe to −15 Oe, and said spacer layer is formed with a thickness of from 16 Å to 20 Å.

6. A hard disk drive including a magnetic head as scribed in claim 5 wherein said coupling field strength is approximately −10 Oe, and said $CuO_x$ spacer thickness is approximately 17 Å.

7. A hard disk drive including a magnetic head as described in claim 5 wherein said pinned magnetic layer laminated structure includes layers of CoFe, Ru, and CoFe having thicknesses of 17 Å, 8 Å and 17 Å respectively.

8. A hard disk drive including a magnetic head as described in claim 5 wherein said free magnetic layer laminated structure includes layers of CoFe and NiFe having thicknesses of 10 Å and 20 Å respectively.

* * * * *